(12) United States Patent
Klein

(10) Patent No.: US 6,493,798 B2
(45) Date of Patent: Dec. 10, 2002

(54) UPGRADEABLE CACHE CIRCUIT USING HIGH SPEED MULTIPLEXER

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/837,857

(22) Filed: Apr. 17, 2001

(65) Prior Publication Data
US 2001/0047455 A1 Nov. 29, 2001

Related U.S. Application Data

(63) Continuation of application No. 09/158,169, filed on Sep. 21, 1998, now Pat. No. 6,219,755.

(51) Int. Cl.[7] .......................... G06F 12/00; G06F 13/00
(52) U.S. Cl. ........................ 711/118; 711/122; 711/141
(58) Field of Search .......................... 711/3, 115, 118, 711/122, 141, 154, 170

(56) References Cited

U.S. PATENT DOCUMENTS

| | | | |
|---|---|---|---|
| 4,575,792 A | 3/1986 | Keeley | 364/200 |
| 4,654,787 A | 3/1987 | Finnell et al. | 364/200 |
| 4,787,060 A | 11/1988 | Boudreau et al. | 365/200 |
| 5,265,232 A | 11/1993 | Gannon et al. | 395/425 |
| 5,446,860 A | 8/1995 | Dresser et al. | 395/427 |
| 5,455,925 A | 10/1995 | Kitahara et al. | 395/449 |
| 5,539,912 A | 7/1996 | Clarke, Jr. et al. | 395/800 |
| 5,586,270 A | 12/1996 | Rotier et al. | 395/282 |
| 5,604,871 A | 2/1997 | Pecone | 395/281 |
| 5,604,875 A | 2/1997 | Munce et al. | 395/311 |
| 5,638,506 A | 6/1997 | Peterson et al. | 395/182.06 |
| 5,640,531 A | 6/1997 | Whittaker et al. | 395/445 |
| 5,666,321 A | 9/1997 | Schaefer | 365/233.5 |
| 5,677,890 A | 10/1997 | Liong et al. | 365/229 |
| 5,784,548 A | 7/1998 | Liong et al. | 395/182.04 |
| 5,829,036 A | 10/1998 | Klein | 711/141 |
| 5,881,254 A | 3/1999 | Corrigan et al. | 395/309 |
| 6,119,197 A | 9/2000 | Klein | 711/2 |
| 6,219,755 B1 | 4/2001 | Klein | 711/118 |

OTHER PUBLICATIONS

Intel Corporation, "Coast 3.1, Flexible Cache Solution for the Intel 430FX, 430HX and 430VX PCIset," pp. 1–41, Jun. 10, 1996.

"Secondary Cache Daughterboard Assembly for 486/386–Based Personal Computers", IBM TDB, pp. 225–226.

Primary Examiner—Tuan V. Thai
(74) Attorney, Agent, or Firm—Dorsey & Whitney LLP

(57) ABSTRACT

An upgradeable cache circuit is described which automatically routes those control signals necessary to maintain cache coherency in a computer system having a processor (with integrated L1 cache) coupled with main memory by a controller. The cache circuit includes an L2 cache module connector and a high speed multiplexer having minimal propagation delay. The multiplexer selects one of two sets of control signals to route to and from the processor, controller and cache circuit, corresponding to the presence or absence of an L2 cache module in the cache module connector.

21 Claims, 2 Drawing Sheets

UPGRADEABLE CACHE CIRCUIT USING HIGH SPEED MULTIPLEXER

This application is a continuation of U.S. patent application Ser. No. 09/158,169, filed Sep. 21, 1998 now U.S. Pat. No. 6,219,755.

TECHNICAL FIELD

This invention relates generally to computer systems, and more particularly to cache memory modules used in computer systems.

BACKGROUND OF THE INVENTION

In today's computer systems, the speed of microprocessors has outstripped the speed of typical main memory DRAM systems. When a processor accesses main memory, the processor remains idle for a number of clock cycles, thus wasting precious time. In order to provide as many zero wait state memory accesses as possible, while maintaining a reasonable system cost, many of today's computer systems provide a high speed SRAM cache module. The faster and more expensive SRAM contains a subset of the slower and less expensive DRAM contents. The memory cache contains copies of data lines from main memory, each line including multiple bytes of data or program instructions (collectively referred to as "data").

When the microprocessor initiates a memory cycle (read or write), the cache module determines whether it contains a copy of a data line having data at the memory location specified by the microprocessor. If a copy resides in the cache (a cache hit), the microprocessor can achieve a zero wait state memory access. If a copy does not reside in the cache (a cache miss), a main memory access occurs, and the microprocessor remains idle for a number of clock cycles. As the processor operates, the cache contents are regularly changed to include copies of memory lines recently requested by the microprocessor (temporal locality) and to include memory lines in memory locations consecutive to those recently requested (spatial locality).

In the case of a write operation to a memory location having data copied in the cache (a cache write hit), the cache memory is updated, and main memory is then said to contain stale information. The cache line is said to be modified, or dirty, because it is no longer a duplicate of the corresponding line in memory. If main memory is not updated and another bus master (such as a DMA or SCSI controller) accesses main memory, data consistency/coherency problems may result.

Variations on two distinct write policies are employed to prevent data coherency problems. One is called a write-through policy, in which the cache immediately passes each write operation initiated by the microprocessor through to main memory. Even in the case of a cache write hit, both the cache line and the corresponding line in main memory are updated, thereby ensuring consistency between the cache and main memory. The write-through policy is simple to implement, but has the performance limitations associated with each write operation requiring access to the slow main memory.

A second write policy is called a write-back policy, in which main memory is updated only when necessary. This keeps the system bus free for use by other bus masters and is particularly advantageous when significant system I/O activity is expected. Main memory is updated when (1) a bus master other than the microprocessor initiates a read access to a memory line which contains stale data; (2) a bus master other than the microprocessor initiates a write access to a memory line which contains stale data; and (3) a modified cache line is about to be overwritten to store a copy of a memory line newly requested by the microprocessor. When a bus master other than the microprocessor initiates a memory cycle, the cache module must monitor, or snoop, the system bus to check for memory accesses to lines marked as modified in the cache.

Many of today's microprocessors include an SRAM cache internal to the microprocessor chip. Such a cache is called an L1 cache. Computer system designers may still provide a supplementary external cache, called an L2 cache, to further increase system performance. Maintaining coherency amongst the various caches and main memory is correspondingly more complex than for the exemplary single cache system discussed above, particularly when one or more of the caches employs a write-back policy.

It is oftentimes desirable to allow an end user or manufacturer to decide whether to include the external L2 cache as an upgrade to the computer system. In such a case, the system designer provides a connector for an optional cache module. This reduces manufacturing costs, since a single system board can be used for computer systems with or without an external L2 cache. However, the various control signals necessary to maintain cache coherency must then be routed differently, depending on whether the optional L2 cache module is included. Currently, the alternative routing of the control signals is accomplished with jumpers, which must be physically connected according to whether the L2 cache module upgrade is included. The use of jumpers can be quite inconvenient, particularly for an end user of modest technical sophistication.

SUMMARY OF THE INVENTION

According to the present invention, a user-friendly upgradeable cache circuit is provided which automatically routes those control signals necessary to maintain cache coherency. The cache circuit includes a cache module connector and a high speed multiplexer having minimal propagation delay. The multiplexer selects one of two sets of control signals corresponding to the presence or absence of a cache module in the cache module connector.

A computer circuit is provided which includes a controller coupling a processor with main memory. The main memory stores data, and the processor includes an internal cache which stores a subset of the data stored in main memory. The cache circuit is coupled with the processor and with the controller, and includes cache connecting circuitry and switching circuitry. The cache connecting circuitry can receive an optional external cache module and produces a detect signal having a state which indicates whether the external cache module is employed. The switching circuitry responds to the detect signal and inputs to the processor one of two cache inquire signals, depending on the state of the detect signal. One of the cache inquire signals is produced by the controller, and the other is produced by the cache connecting circuitry. The switching circuitry also responds to the detect signal to input to the controller one of two cache content signals, depending on the state of the detect signal. One of the cache content signals is produced by the processor, and the other is produced by the cache connecting circuitry.

A method is provided for controlling cache coherency inquire and write-back cycles in a computer circuit having a controller coupling a processor with a main memory. The processor includes an internal cache, and a cache circuit capable of receiving an optional external cache module is coupled with the controller and the processor. A detect signal is produced. The detect signal has a state which indicates whether the optional external cache module has been employed. First and second cache inquire signals are produced which, when asserted and input to the processor, initiate a cache coherency inquire cycle. Depending on the state of the detect signal, a corresponding one of the first and second cache inquire signals is input to the processor. Also, first and second cache content signals are produced which, when asserted and input to the controller, initiate a cache write back cycle. Depending on the state of the detect signal, a corresponding one of the first and second cache content signals is input to the controller.

DETAILED DESCRIPTION OF SPECIFIC EMBODIMENTS

A user-friendly upgradeable cache circuit is described which automatically routes certain control signals to maintain cache coherency. In the following description, specific details are set forth, such as specific microprocessor, multiplexer and circuit element types, in order to provide a thorough understanding of the preferred embodiment of the present invention. It will be obvious, however, to one skilled in the art that the present invention may be practiced without these details. In other instances, well-known circuits have not been shown in detail in order not to unnecessarily obscure the invention. Also not presented are other well-known control signals and timing protocols associated with cache coherency inquire cycles.

Figure 1:
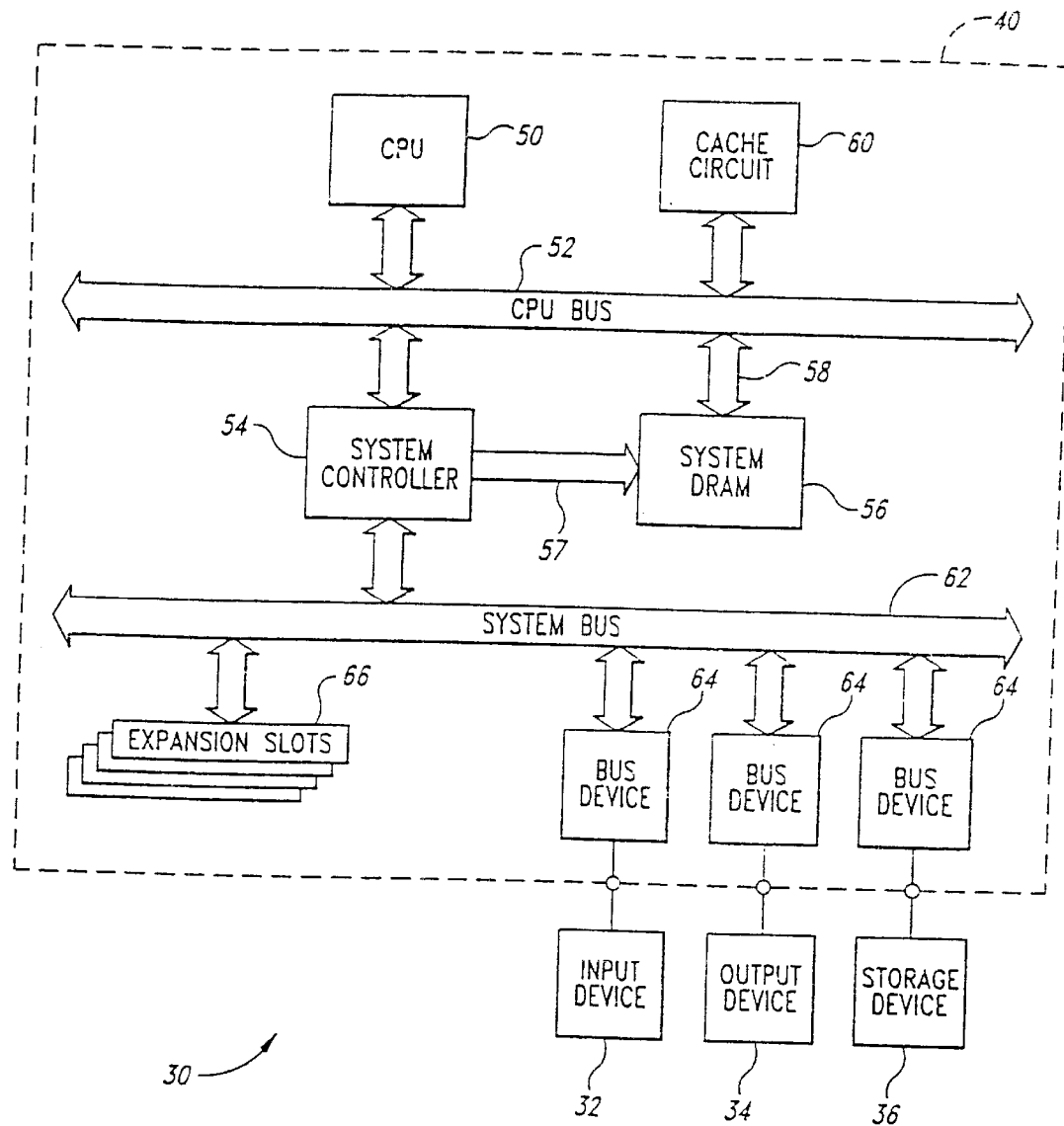
FIG. 1 is a block diagram of a computer system having a cache circuit according to the present invention.

FIG. 1 is a block diagram of a computer system 30 according to the present invention. One or more input devices 32, such as a keyboard or a pointing device, is coupled to computer circuitry 40 and allows an operator (not shown) to manually input data thereto. One or more output devices 34 is coupled to the computer circuitry 40 to provide data generated by the circuitry to the operator. Examples of output devices 34 include a printer and a video display unit. One or more data storage devices 36 is coupled to the computer circuitry 40 to store data on or retrieve data from external storage media (not shown). Examples of storage devices 36 and associated storage media include drives that accept hard and floppy disks, magnetic tape recorders, and compact-disc read only memory (CD-ROM) readers.

The computer circuit 40 includes an upgradeable cache circuit 60 according to the present invention. A microprocessor 50, such as the Pentium™ processor, is connected to a CPU bus 52 which carries address, data and control signals. The CPU bus 52 is in turn connected to a system controller 54, which acts as a memory controller accessing a main memory system DRAM 56 via a memory address and control bus 57. The data portion of the CPU bus 52 is coupled with the system DRAM 56 by a memory data bus 58. The upgradeable cache circuit 60 is connected to the CPU bus 52. As explained in detail below, the cache circuit 60 provides the option of including an external L2 cache module (not shown) in the system.

The system controller 54 also serves as a bridge circuit between the CPU bus 52 and a system bus 62. The system bus 62 may itself be a combination of one or more bus systems with associated interface circuitry (e.g., PCI bus with connected SCSI and ISA bus systems). Connected to the system bus are multiple bus devices 64 and expansion slots 66. Well-known examples of bus devices include a floppy disk drive circuitry module with DMA controller, a CD ROM drive circuitry module with SCSI controller, a VGA controller for connecting to an output device 34 such as a video display unit, an IDE interface module for connecting to a storage device 36 such as a hard disk drive, and a keyboard/mouse controller for connecting to an input device 32 such as a keyboard or pointing device. The expansion slots 66 provide future accommodation of other bus devices not selected during the original design of the computer system.

Microprocessors such as the Pentium™ processor include an integrated L1 data cache. As described above, maintaining the coherency of cache and system main memory is desirable for proper system performance. In the case where no L2 cache module is connected to the cache circuit 60, it is a matter of maintaining L1 cache coherency. When a bus master other than the microprocessor 50 (such as a DMA or SCSI controller) initiates a memory cycle, an inquire cycle is first performed in which the microprocessor 50 determines whether the addressed location in the system DRAM 56 is copied in the L1 cache. As is well known for the exemplary Pentium™ processor 50, inquire cycles can be performed when the microprocessor is forced off the CPU bus 52 by asserting either of the BOFF# ("Back Off," asserted low as indicated by the "#" label)) and AHOLD ("Address Hold," asserted high as indicated by the absence of the "#" label) signals output by the system controller 54 and input to the microprocessor. The inquire cycle is then performed by placing an inquire address on the address portion of the CPU bus 52 and asserting the EADS# ("External Address Strobe") signal. If a cache hit to a modified line occurs, the Pentium™ processor 50 outputs a signal known as HITM# ("Hit Modified Line") which is input to the system controller 54. A modified line must then be written back to the system DRAM 56 before providing the data to the requesting bus master (alternatively, the data may be provided directly from the cache).

In the case where an external L2 cache module is connected to the cache circuit 60, maintaining cache coherency requires a rerouting of certain of the control signals. For purposes of routing these control signals, the L2 cache module is functionally interposed between the microprocessor 50 and the system controller 54. As such, the L2 cache module provides the signal to initiate inquire cycles by the Pentium™ processor 50 and provides to the system controller 54 a signal which indicates whether a cache hit to a modified line occurs in either of the L1 or L2 caches.

Figure 2:
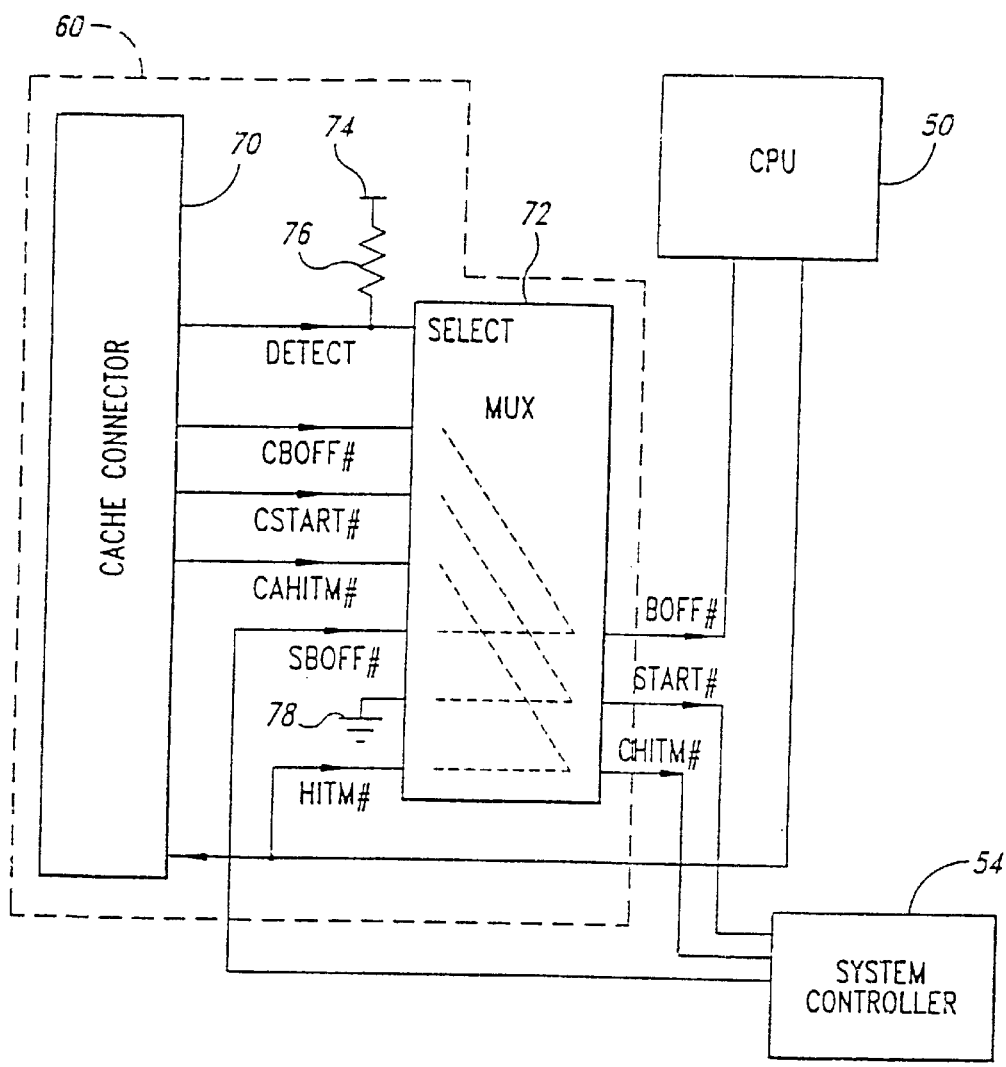
FIG. 2 is a part block, part schematic, diagram showing details of the cache circuit of FIG. 1.

Referring to FIG. 2, details of the cache circuit 60 are described. Those skilled in the art will appreciate that numerous address, data and control signal lines are not shown in order not to unnecessarily obscure the description of the embodiment of the invention. The cache circuit 60 includes a cache connector 70 and a high speed multiplexer or mux 72, such as a QuickSwitch® QS3257, available from Quality Semiconductor, Inc. When an optional L2 cache module (not shown) is plugged into the cache connector 70, a DETECT signal is pulled low. The DETECT signal serves as a select signal input to the mux 72. In the absence of the L2 cache module, the DETECT signal is held high by the combination of a high supply voltage 74 and resistor 76.

When the DETECT signal is held high, the mux 72 selects a SBOFF# ("System Backoff") signal to pass to the Pentium™ processor 50 as the BOFF# input signal. Thus, the system controller 54 is able to initiate the cache coherency inquire cycles. When the DETECT signal is high, the mux 72 also passes the HITM# output from the Pentium™ processor 50 to the system controller 54 as a CHITM# ("Cache Hit Modified Line") input signal. The state of the CHITM# signal indicates to the system controller 54 whether the Pentium™ L1 cache has a modified line corresponding to the memory location addressed by a bus master other than the Pentium™ processor. Also, the mux 72 passes a low supply voltage 78 to the system controller 54 as a START# input signal. An asserted START# signal indicates an L2 cache miss to the system controller 54, which then starts a main memory access cycle (assuming an L1 cache miss). Thus, in the absence of an L2 cache module in the cache connector 70, all cache inquire cycles result in an L2 cache miss.

When the DETECT signal is pulled low by the presence of an L2 cache module (not shown) in the cache connector 70, the mux 72 selects a CBOFF# ("Cache Backoff") signal to pass to the Pentium™ processor 50 as the BOFF# input signal. In other words, the L2 cache module is now able to initiate the cache coherency inquire cycles. The L2 cache module receives the HITM# signal output from the Pentium™ processor 50 and provides a CAHITM# output signal. The mux 72 passes the CAHITM# signal to the system controller 54 as the CHITM# input signal. The state of the CHITM# signal indicates to the system controller 54 whether either of the L1 or L2 caches has a modified line corresponding to the memory location addressed by a bus master other than the Pentium™ processor. Also, the mux 72 passes a CSTART# signal to the system controller 54 as the START# input signal, indicating whether an L2 cache miss/hit has occurred.

When no optional L2 cache module is present, the mux 72 provides a cache coherency cycle in which the Pentium™ processor 50 and system controller 54 are coupled just as in a system originally designed without an L2 cache. If instead an optional L2 cache module is plugged into the cache connector 70, the mux 72 provides a cache coherency cycle in which the L2 cache module is functionally interposed between the Pentium™ processor 50 and system controller 54, just as in a system originally designed to have an L2 cache. Thus, the cache circuit 60 of the present invention provides a convenient circuit for accommodating an optional L2 cache module in a computer system design. Unlike currently available circuits for optional cache modules, the user-unfriendly setting of jumpers is not required.

Currently available circuits require that processor signals BOFF# and HITM# (as well as the corresponding system controller and cache module signals described above) be routed by jumpers. Although jumpers provide minimal propagation delay connections, an end user of modest technical sophistication has great difficulty upgrading current computer systems. In contrast, the present invention provides a user-friendly automatic routing of the requisite control signals, and no setting of jumpers is required to upgrade a computer system. Also, a high speed mux such as the preferred QS3257 QuickSwitch® has essentially zero propagation delay and so, like jumpers, does not interfere with the precise timing and high speed signal propagation required by today's microprocessors.

It will be appreciated that, although an embodiment of the invention has been described above for purposes of illustration, various modifications may be made without deviating from the spirit and scope of the invention. For example, the present invention has been described as switching signals to provide the BOFF# input signal to a Pentium™ processor for initiating a cache coherency inquire cycle. However, those skilled in the art will appreciate that the present invention could instead switch signals appropriate to apply either of the well-known AHOLD or HLDA signals to the Pentium™ processor to initiate such an inquire cycle. Also, while particular processor and high speed multiplexer types have been specified, any of a variety of well-known processor and high speed switching circuits could be employed. In particular, a switched configuration of high speed pass transistors or transmission gates is a suitable substitute for the particular QuickSwitch® mux described. Those skilled in the art will also appreciate that the present invention teaches how other control signals between a computer system microprocessor and controller can be conveniently and appropriately rerouted, depending on the presence/absence of system upgrade modules. Numerous variations are well within the scope of this invention. Accordingly, the invention is not limited except as by the appended claims.

What is claimed is:

1. A computer system, comprising:
   a main memory for storing data;
   a processor coupled with the main memory and having an internal cache memory for storing a subset of the data stored in the main memory, the processor having a cache coherency terminal; external cache connecting circuitry structured to receive an external cache module, the external cache connecting circuitry having a cache coherency terminal; and
   a system controller having a cache coherency terminal; and signal routing circuitry coupled with the processor, the system controller, and the external cache connecting circuitry, the signal routing circuitry having first and second states and being operable in the first state to couple the cache coherency terminal of the system controller to the cache coherency terminal of the processor, and being operable in the second state to couple in cache coherency terminal of the system controller to the cache coherency terminal of the external cache connecting circuitry;
   wherein the external cache connecting circuitry is structured to produce a detect signal when the external cache connecting circuitry receives the external cache module, the detect signal being applied to the signal routing circuitry to cause the signal routing circuitry to assume the second state.

2. The computer system of claim 1 wherein the signal routing circuitry comprises a multiplexer.

3. The computer system of claim 1 wherein the processor is coupled by a processor bus operable to carry address, data, and control signals, and wherein the processor bus is also operable to couple the external cache connecting circuitry with the processor.

4. The computer system of claim 1 wherein the processor is coupled by a processor bus operable to carry address, data, and control signals, and further comprising an input/output device coupled with the system controller by a system bus operable to carry address, data, and control signals between the input/output device and the processor.

5. The computer system, comprising:
   a main memory for storing data;
   a processor coupled with the main memory, the processor having a cache coherency terminal;
   a system controller having a cache coherency terminal; external cache connecting circuitry having a cache coherency terminal, the external cache connecting circuitry being structured to receive an external cache module; and signal routing circuitry coupled with the processor and the external cache connecting circuitry, the signal routing circuitry having first and second states and being operable in the first state to couple the cache coherency terminal of the processor to the cache coherency terminal of the system controller via a first signal path, and being operable in the second state to couple the cache coherency terminal of the processor to the cache coherency terminal of the external cache connecting circuitry via a second signal path;

wherein the external cache connecting circuitry is structured to produce a detect signal when the external cache connecting circuitry receives the external cache module, the detect signal being applied to the signal routing circuitry to cause the signal routing circuitry to assume the second state.

6. The computer system of claim 5 wherein the signal routing circuitry comprises a multiplexer.

7. The computer system of claim 5 wherein the processor is coupled by a processor bus operable to carry address, data and control signals, and wherein the processor bus is also operable to couple the external cache connecting circuitry with the processor.

8. The computer system of claim 5 wherein the processor is coupled by a processor bus operable to carry address, data, and control signals, and further comprising an input/output device coupled with the system controller by a system bus operable to carry address, data, and control signals between the input/output device and the processor.

9. A computer circuit including a controller coupling a processor with a main memory, the main memory operable to store data and the processor including an internal cache operable to store a subset of the data stored in the main memory, the controller operable to transfer data between the main memory and the processor, the computer circuit further including external cache circuitry coupled with the processor and the controller, the external cache circuitry comprising switching circuitry coupled to the cache connecting circuitry and to the processor and controller, the switching circuitry having first and second states to input to the processor a respective one of first and second cache inquire signals, each having asserted and deasserted states, the first cache inquire signal being output from the controller and the second cache inquire signal being output from the cache connecting circuitry, the processor examining the data stored in the internal cache in response to each of the first and second cache inquire signals of the asserted state;

wherein the controller is further operable to couple a bus device with the main memory and to transfer data between the main memory and the bus device, and wherein one of the first and second cache inquire signals of the asserted state is input to the processor in response to initiation of data transfer between the bus device and the main memory.

10. The circuit of claim 9 wherein the switching circuitry is operable to input to the controller one of first and second cache content signals responsive to the first and second states, respectively, each of the first and second cache content signals having asserted and deasserted states, the first cache content signal being output from the processor and the second cache content signal being output from the cache connecting circuitry, the first cache content signal of the asserted state indicating data stored in the internal cache has been modified, and the second cache signal of the asserted state indicated data stored in one of an internal cache and an external cache module has been modified.

11. The computer circuit of claim 9 wherein the switching circuitry is operable to input to the controller one of first and second cache content signals responsive to the first and second states, respectively, each of the cache content signals having asserted and deasserted states, the first cache content signal being output from the processor and the second cache content signal being output from the cache connecting circuitry, the first cache content signal of the asserted state indicating data stored in the internal cache has been modified, and the second cache content signal of the asserted state indicating data stored in one of an internal cache and an external cache module has been modified, the cache connecting circuitry receiving the first cache signal.

12. The computer circuit of claim 9 wherein the switching circuitry comprises a multiplexer.

13. The computer circuit of claim 9 wherein the switching circuitry comprises a plurality of transmission gates.

14. The computer circuit of claim 9 wherein the cache connecting circuitry comprises a cache connector operable to receive an external cache module.

15. A computer circuit including a controller coupling a processor with a main memory, the main memory operable to store data and the processor including an internal cache operable to store a subset of the data stored in the main memory, the controller operable to transfer data between the main memory and the processor, the controller also coupling a bus device with the main memory and transferring data between the main memory and the bus device, the computer circuit further including external cache circuitry coupled with the processor and the controller, the external cache circuitry comprising switching circuitry coupled to the cache connecting circuitry and to the processor and controller, the switching circuitry having first and second states and being operable to input to the processor a first cache inquire signal responsive to the first state and to input to the processor a second cache inquire signal responsive to the second state, each of the cache inquire signals having asserted and deasserted states, the first cache inquire signal being output from the controller and the second cache inquire signal being output from the cache connecting circuitry, the first and second cache inquire signals of the asserted state being input to the processor in response to initiation of data transfer between the bus device and the main memory, the processor examining the data stored in the internal cache in response to each of the first and second cache inquire signals of the asserted state, the switching circuitry further being operable to input to the controller a first cache content signal responsive to the switching circuitry being in the first state and to input to the controller a second cache content signal responsive to the switching circuitry being in the second state, each of the cache content signals having asserted and deasserted states, the first cache content signal being output from the processor and the second cache content signal being output from the cache connecting circuitry, the first cache content signal of the asserted state indicated data stored in the internal cache has been modified, and the second cache content signal of the asserted state indicating data stored in one of the internal cache and external cache module has been modified, the cache connecting circuitry receiving the first cache signal.

16. The computer circuit of claim 15 wherein the switching circuitry includes a multiplexer, and wherein the cache connecting circuitry includes a cache connector operable to receive an external cache module.

17. A computer system, comprising:
   a data input device;
   a data output device;

a data storage device; and computer circuitry coupled to the data input device and the data output device and including a controller coupling a processor with a main memory, the main memory operable to store data and the processor including an internal cache operable to store a subset of the data stored in the main memory, the controller operable to transfer data between the main memory and the processor, the computer circuitry further including external cache circuitry coupled with the processor and the controller, the external cache circuitry comprising switching circuitry coupled to the cache connecting circuitry and to the processor and controller, the switching circuitry having first and second states and being operable to input to the processor a first cache inquire signal responsive to the switching circuitry having the first state and being operable to input to the processor a second cache inquire signal responsive to the switching circuitry having the second state, each of the cache inquire signals having asserted and deasserted states, the first cache inquire signal being output from the controller and the second cache inquire signal being output from the cache connecting circuitry, the processor examining the data stored in the internal cache in response to each of the first and second cache inquire signals of the asserted state;

wherein the first and second cache inquire signals of the asserted state are input to the processor in response to initiation of data transfer between the main memory and one of the data input, data output and data storage devices, the switching circuitry being operable to input to the controller a first cache content signals responsive to the switching circuitry having the first state and being operable to input to the controller a second cache contents signals responsive to the switching circuitry having the second state, each of the cache content signals having asserted and deasserted states, the first cache content signal being output from the processor and the second cache content signal being output from the cache connecting circuitry, the first cache content signal of the asserted state indicating data stored in the internal cache has been modified, and the second cache content signal of the asserted state indicating data stored in one of the internal cache and external cache module has been modified.

18. The computer system of claim 17 wherein the switching circuitry includes one of a multiplexer and a switched configuration of a plurality of transmission gates.

19. A computer system, comprising a main memory for storing data;

a system controller;

a processor coupled with the main memory and having an internal cache memory for storing a subset of the data stored in the main memory, the processor being operable to produce and receive a plurality of a cache coherency inquire signals and further being operable to receive and produce cache coherency control signals;

external cache connecting circuitry coupled with the processor and with the system controller, the external cache connecting circuitry being operable to receive an external cache module; and control signal routing circuitry having first state and second states, the control signal routing circuit being operable to transmit the cache coherency control signals between the processor and the system controller when the controller signal routing circuitry is in the first state, the control signal routing circuitry being operable to transmit the cache coherency control signals to and from the external chance module when the control signal routing circuitry is in the second state;

wherein the processor and system controller are couple by a processor bus operable to carry address, data and control signals, and wherein the processor bus is also operable to couple the external cache connecting circuitry with the system controller and with the processor.

20. The computer system of claim 17 wherein the switching circuitry comprise a multiplexer.

21. The computer system of claim 19 wherein the processor and system controller are coupled by a processor bus operable to carry address, data, and control signals, and further comprising an input/output device coupled with the system controller by a system bus operable to carry address, data, and control signals between the input/output device and the system controller.

* * * * *